(12) United States Patent
Hudson et al.

(10) Patent No.: US 9,504,196 B2
(45) Date of Patent: Nov. 29, 2016

(54) POST-HOLE DIGGER WITH FOOT RESTS

(71) Applicants: Andrew John Hudson, Santa Rose, CA (US); Caralin Riva Adair, Santa Rosa, CA (US)

(72) Inventors: Andrew John Hudson, Santa Rose, CA (US); Caralin Riva Adair, Santa Rosa, CA (US)

( * ) Notice: Subject to any disclaimer, the term of this patent is extended or adjusted under 35 U.S.C. 154(b) by 0 days.

(21) Appl. No.: 15/084,139

(22) Filed: Mar. 29, 2016

(65) Prior Publication Data

US 2016/0286711 A1 Oct. 6, 2016

Related U.S. Application Data

(60) Provisional application No. 62/140,297, filed on Mar. 30, 2015.

(51) Int. Cl.
| | | |
|---|---|---|
| *A01B 1/00* | (2006.01) | |
| *A01B 1/02* | (2006.01) | |
| *A01C 5/02* | (2006.01) | |
| *E02F 3/02* | (2006.01) | |
| *E21B 11/00* | (2006.01) | |

(52) U.S. Cl.
CPC .............. *A01B 1/024* (2013.01); *A01B 1/02* (2013.01); *A01C 5/02* (2013.01); *E02F 3/02* (2013.01); *E21B 11/005* (2013.01)

(58) Field of Classification Search
CPC .................................................... A01B 1/024
USPC ...... 294/50.5, 50.6, 50.7, 50.8, 59, 60; D8/4
See application file for complete search history.

(56) References Cited

U.S. PATENT DOCUMENTS

| | | | |
|---|---|---|---|
| 199,501 A * | 1/1878 | Bowman ............. | A01G 23/046 111/101 |
| 226,118 A | 3/1880 | Scheidler | |
| 253,929 A * | 2/1882 | Lee .................... | A01B 1/18 294/50.9 |
| 324,835 A | 8/1885 | Grath et al. | |
| 325,212 A * | 8/1885 | Kohler ................. | A01B 1/18 294/50.8 |
| 493,110 A * | 3/1893 | Orthwein ............. | A01B 1/024 294/60 |
| 836,541 A * | 11/1906 | Spriggs ............... | A01G 3/06 294/60 |
| 1,097,067 A | 5/1914 | Unruh | |
| 1,222,711 A * | 4/1917 | Armstrong, Sr. ..... | A01B 1/18 294/50.8 |
| 1,445,548 A * | 2/1923 | Owen .................. | A01B 1/02 294/60 |
| 1,576,969 A * | 3/1926 | Hackenberger ...... | A01B 1/18 294/50.8 |
| 2,028,680 A * | 1/1936 | Mayeda et al. ....... | A01B 1/18 294/115 |

(Continued)

OTHER PUBLICATIONS

DDL Wiki, "Lead-Screw Post Hole Digger." Internet. Available at http://v.iki.ece.crru.edu/ddl/indexphp/lead-screw_post_hole_digger. Last visited Jul. 23, 2014.

(Continued)

*Primary Examiner* — Paul T Chin
(74) *Attorney, Agent, or Firm* — PatentBest; Andrew McAleavy

(57) ABSTRACT

A foot rest for a post-hole digger and post-hole diggers using the foot rest are disclosed. The foot rest includes two portions, one attached to each shaft of the post-hole digger. The two portions have structure that allows them to engage one another when the two shafts of the post-hole digger are vertical. The foot rest does not extend beyond the bore diameter of the post-hole digger. Thus, in order to keep the user's feet on the relatively short foot rest, the contact surface of the foot rest may be angled. In some embodiments, the foot rest may be symmetrical, so that either side may be used as the upper surface. A post-hole digger including the foot rests typically includes at least two foot rests, spaced from one another and facing different directions along the shafts of the tool.

19 Claims, 6 Drawing Sheets

(56) References Cited

U.S. PATENT DOCUMENTS

| | | | |
|---|---|---|---|
| 2,735,715 A * | 2/1956 | Hart | B62D 33/0273 |
| | | | 16/231 |
| 2,791,879 A | 5/1957 | Truran | |
| 3,053,331 A | 9/1962 | Corley | |
| 5,669,648 A * | 9/1997 | Luck | E21B 11/005 |
| | | | 294/50.8 |
| 6,047,651 A | 4/2000 | Wilson | |
| 6,076,614 A | 6/2000 | Gracy | |
| 7,117,954 B2 | 10/2006 | Vipond | |
| 7,654,018 B2 | 2/2010 | Lancaster | |
| 7,988,162 B2 | 8/2011 | Sands | |
| 2003/0037715 A1 | 2/2003 | Santa Cruz et al. | |
| 2007/0209215 A1 * | 9/2007 | Retterer | B23D 29/02 |
| | | | 30/241 |
| 2010/0051297 A1 | 3/2010 | Mathieu | |

OTHER PUBLICATIONS

DDL Wiki, "Post Hole Digger Redesign." Internet. Available at https:/Miki.ece.cmu.edu/ddl/indexphp/Post_hole_digger_redesign. Last visited Jul. 22, 2014.

Farm Show Magazine, "'Pogo' Post Hole Digger Uses Your Weight to Dig," vol. 25, Issue 3, p. 4, 2001. Internet. Available at http://www.farmshow.com/a_article.php?aid=14416. Last visited Jul. 22, 2014.

* cited by examiner

POST-HOLE DIGGER WITH FOOT RESTS

BACKGROUND OF THE INVENTION

1. Field of the Invention

In general, the invention relates to digging tools, and more particularly, to post-hole digging tools with footrests.

2. Description of Related Art

A post-hole digger is a digging tool intended to dig deep, narrow holes for the placement of fence posts, sign posts, and other, similar structures. In a typical post-hole digger, the head of the tool includes two rounded digging blades that face one another and are connected to one another by a hinge. Each shovel head is connected to its own shaft. To use the device, the user drives the tool into the ground and then moves the handles to clamp down on some of the soil that the tool has sunk into before extracting the head, along with the soil, from the hole. The process is repeated until the hole is of sufficient size and depth.

With a typical post-hole digger, the user uses his or her arms to drive the tool into the ground. However, the typical tool does not allow the user to use his or her legs effectively in the process of driving the tool into the ground, and most people have more strength in their legs than in their arms. Thus, using a conventional post-hole digger can be tiring and inefficient.

Over the years, there have been isolated attempts to create post-hole diggers that allow a user to use his or her feet to drive the tool head into the ground, or to use other parts of the body for leverage. U.S. Pat. No. 5,669,648 to Luck is one example—the patent discloses post-hole diggers with a number of horizontal posts that are connected to the shafts with hinges, so that they can be swung up and out of the way if necessary. The horizontal posts can be used as foot rests for driving the tool head. However, the posts extend horizontally far beyond the tool itself, which may interfere with the soil when one tries to dig particularly deep holes. Moreover, the relatively long foot rests may increase the bending and tipping moments generated when pressure is applied, thus making the tool more difficult to use. Additionally, when the Luck tool is in use, dirt and soils may become lodged in the hinges of its foot rests, potentially causing the hinges to jam. If the foot rests open or the hinges jam open while the tool is in use, this could cause the foot rests to act like barbs on a hook, jamming the tool irretrievably in the hole. In fact, merely pulling the tool out of a hole may be enough to trigger the deployment of the foot rests.

The Luck patent recognizes an additional issue with post-hole diggers: when driving the tool into the ground, it is helpful if the two shafts can function as one rigid piece. Luck addresses this issue with a separate, detachable top plate assembly including a reinforcement bar that is attached between the shafts close to the top of the tool. While this may serve to rigidify the tool when it is driven, the top plate assembly and reinforcement bar prevent the tool from closing to remove soil when it is in place, and it may be inconvenient for a user to repeatedly attach and remove the top plate assembly while the tool is in use. Beyond that inconvenience, it is very easy for the user to lose a detachable piece of a tool like the top plate assembly, which would render its advantages moot.

SUMMARY OF THE INVENTION

One aspect of the invention relates to a foot rest for a post-hole digger. The foot rest includes two portions, one attached to each shaft of the post-hole digger. The two portions have structure that allows them to engage one another when the two shafts of the post-hole digger are vertical. The foot rest does not extend beyond the bore diameter of the post-hole digger. Thus, in order to keep the user's feet on the relatively short foot rest, the contact surface of the foot rest may be angled. In some embodiments, the foot rest may be symmetrical about a bisecting horizontal plane, so that either side may be used as the upper surface.

Another aspect of the invention relates to a post-hole digger with foot rests. The post-hole digger has two rounded digging heads opposing one another and connected together at a hinge, with a shaft connected to each of the shovel heads. The post-hole digger includes at least one, and typically at least two, foot rests. The two foot rests face opposite directions and are spaced from one another along the shafts.

Other aspects, features, and advantages of the invention will be set forth in the description that follows.

BRIEF DESCRIPTION OF THE DRAWING FIGURES

The invention will be described with respect to the following drawing figures, in which like numerals represent like features throughout the figures, and in which.

DETAILED DESCRIPTION

Figure 1:
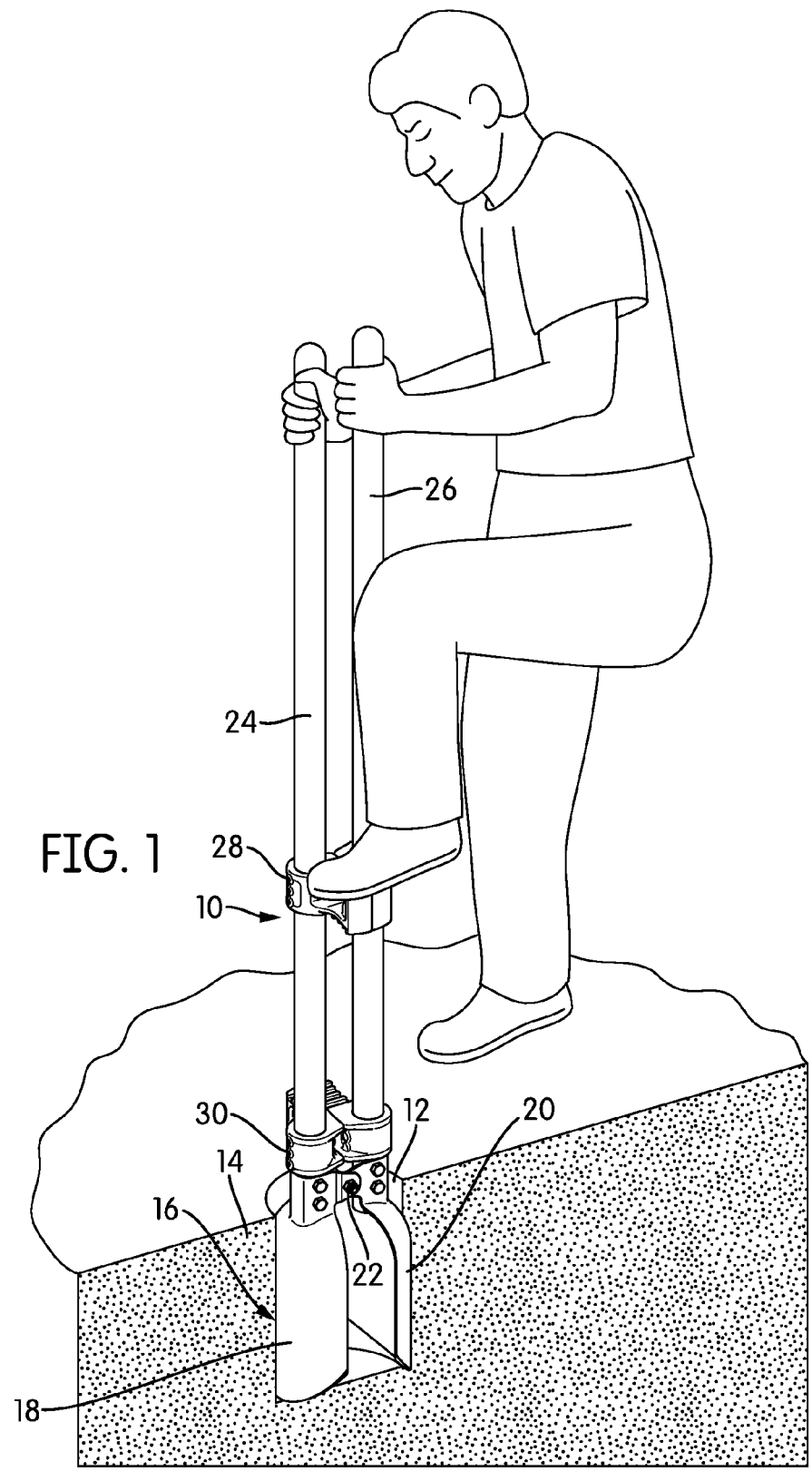
FIG. 1 is a perspective view of a post-hole digging tool according to one embodiment of the invention, shown in use.

FIG. 1 is a perspective view of a post-hole digging tool, generally indicated at 10, according to one embodiment of the invention. The tool 10 is shown in FIG. 1 in use, digging a hole 12 in soil 14. The tool head 16 comprises two downwardly-extending, rounded digging blades 18, 20 that face one another and are connected together at a hinge 22, which pivots to allow the two digging blades 18, 20 to move closer together and farther apart. Each of the digging blades 18, 20 is connected to an individual shaft 24, 26 that, in the view of FIG. 1, extends vertically.

The tool 10 has a pair of foot rests 28, 30 spaced from one another along the length of the shafts 24, 26. Each foot rest 28, 30 extends in a different direction. The tool 10 may include any number of foot rests 28, 30 spaced from one another along the length of the shafts 24, 26. In fact, if a particularly deep hole 12 is to be dug, it may be helpful to have three or four foot rests 28, 30 present. The presence of multiple foot rests 28, 30 may allow increased efficiency, in that the user can create an effective power stroke to drive the tool 10 regardless of its depth. With each foot rest 28, 30 extending in a different direction, the tool 10 provides knee clearance and makes it more difficult for a user who places his or her foot on a lower foot rest 30 to bump against an upper foot rest 28 with his or her knee. As will be described below in more detail, the foot rests 28, 30 may be provided separately and attached to the shafts 24, 26 as necessary.

The illustration of FIG. 1 shows the tool 10 in use, with the user's left foot on an upper foot rest 28 and a lower foot rest 30 closer to the ground level. While the tool 10 may be used in many different ways, the most effective power stroke will be achieved in most cases from a position similar to that shown in FIG. 1: one foot on the ground and the other on one of the foot rests 28, 30.

Figure 2:
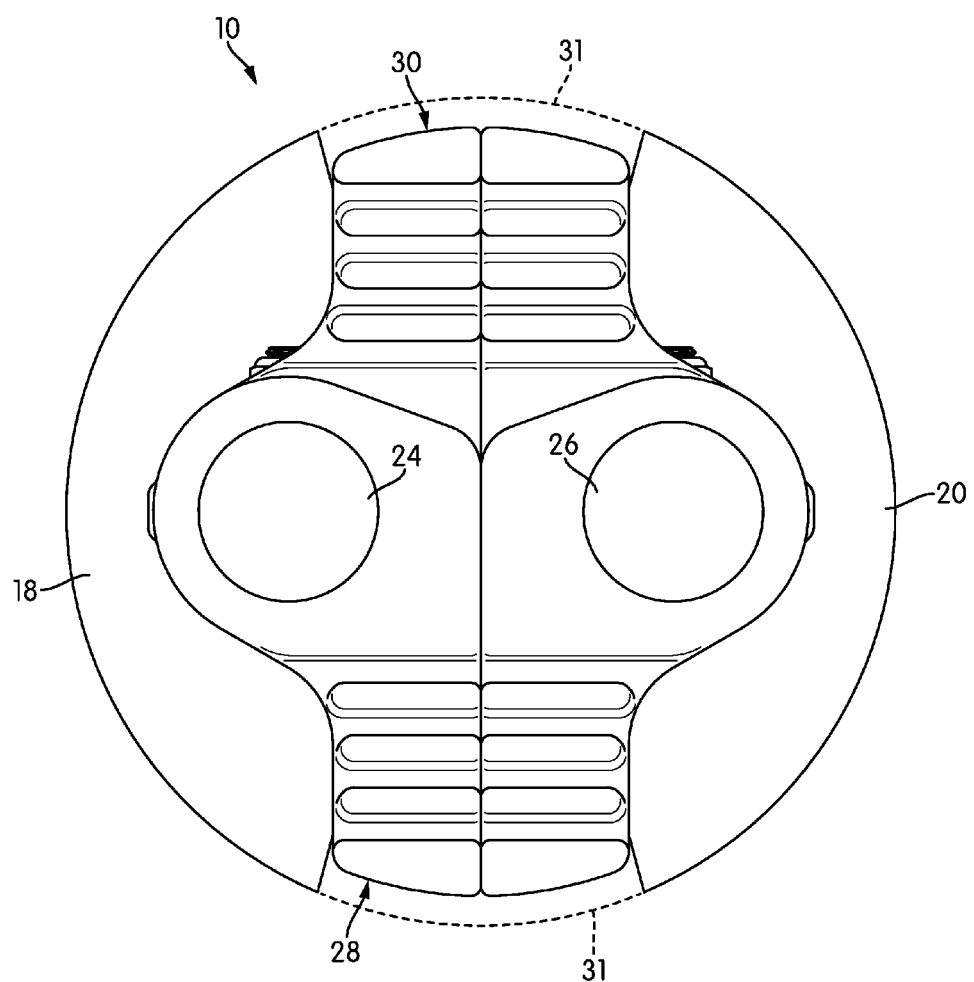
FIG. 2 is a top plan view of the tool of FIG. 1.

FIG. 2 is a top plan view of the tool 10 that illustrates one particular advantage of the tool 10: the foot rests 28, 30 extend within the bore diameter 31 of the tool 10 (i.e., within the diameter of the tool head 16). This means that foot rests 28, 30 will not interfere with the soil 14 or prevent the digging of deep holes 12, and it also places the center of foot pressure closer to the centerline of the tool 10, which means that less bending moment will be generated as the tool 10 is driven into the soil 14, and the tool 10 will be less likely to tip over in use. As shown in FIG. 2, the outer circumferential edge of each foot rest 28, 30 is slightly curved in the illustrated embodiment, although that need not be the case in all embodiments, so long as the foot rests 28, 30 extend only within the bore diameter 31 of the tool 10.

For most standard-sized post-hole diggers, each foot rest 28, 30 would be about 2.5 to 3.25 inches long, measured from the circumferential surfaces of the shafts 24, 26 outward. Multiple foot rests 28, 30 on the same tool 10 would typically be of the same size, although they may vary in size in some embodiments.

Figure 3:
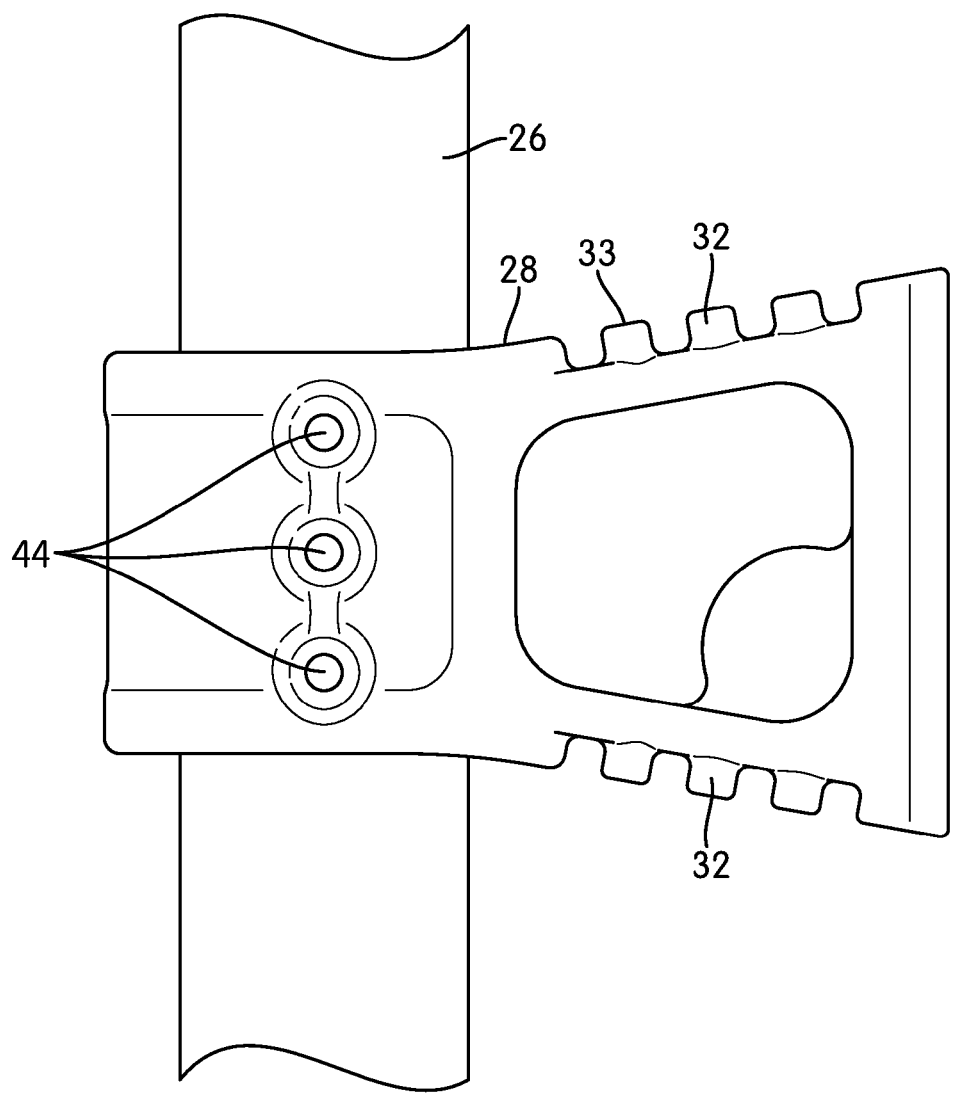
FIG. 3 is a partial side elevational view of the tool of FIG. 1, illustrating the shape of one of the foot rests.

Because the foot rests 28, 30 are relatively short in order to stay within the profile of the tool head 16, the user's feet might have more of a tendency to slip off the foot rests 28, 30 as compared with a longer foot rest. To ameliorate this potential issue and assist in retaining the feet on the foot rests 28, 30, the foot-contacting surface 33 of each foot rest 28, 30 is angled slightly upwardly, for example, approximately 10° degrees, as shown in the partial side elevational view of FIG. 3. This tends to force the foot toward the shaft 26 as pressure is applied. In other embodiments, up-angles in the range of about 5° to about 30° are suitable, with about 10° to about 20° being a particularly useful range.

Figure 4:
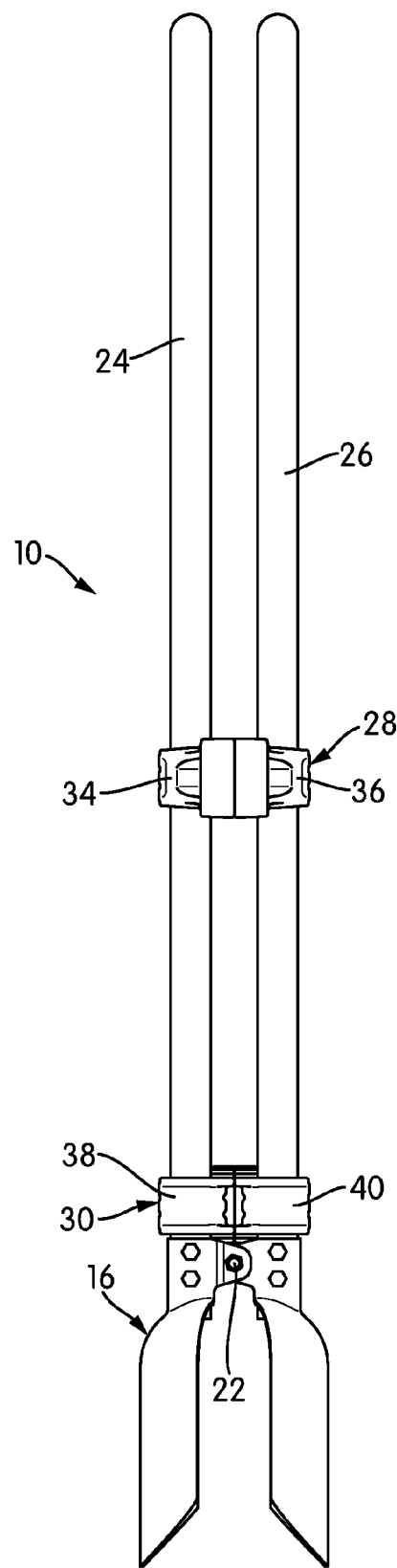
FIG. 4 is a side elevational view of the tool of FIG. 1.

Additionally, the foot rest 28 includes a surface with gripping texture 32 to increase the friction on the sole of the user's shoe or to physically interlock with the tread of a user's shoe. As shown in FIG. 4, the foot rest 28 is symmetrical about a bisecting horizontal plane, with the foot rest 28 flaring out trapezoidally (as viewed in the side elevational view of FIG. 3) to create the same angle on its upper and lower surfaces. The foot rest 28 also includes gripping texture 32 on its upper and lower surfaces. These symmetrical features allow the user to install the foot rest 28 on the shaft 26 with either side facing up.

Additionally, as can be appreciated from FIG. 2, the two foot rests 28, 30 do not extend outwardly along the same line as the digging blades 18, 20. Instead, they are offset (i.e., rotated) 90°. (Compare FIG. 2 with FIG. 2 of U.S. Pat. No. 5,669,648, which was incorporated by reference above.) This arrangement of the foot rests 28, 30 relative to the digging blades 18, 20 potentially provides the user more space.

FIG. 4 is a side elevational view of the tool 10 in the position of FIGS. 1 and 2. Because the foot rests 28, 30 are provided on two individual shafts 24, 26 and those shafts 24, 26 pivot with the hinge 22 of the tool head 16, the foot rests 28, 30 are each comprised of two individual portions. For example, in the view of FIG. 4, the foot rest 28 includes portions 34 and 36, and the foot rest 30 includes portions 38 and 40. When the shafts 24, 26 are moved apart to capture the soil 14 and remove it from the hole 12, the portions 34, 36 and 38, 40 are able to separate from one another, as shown in the side elevational view of FIG. 5.

Figure 5:
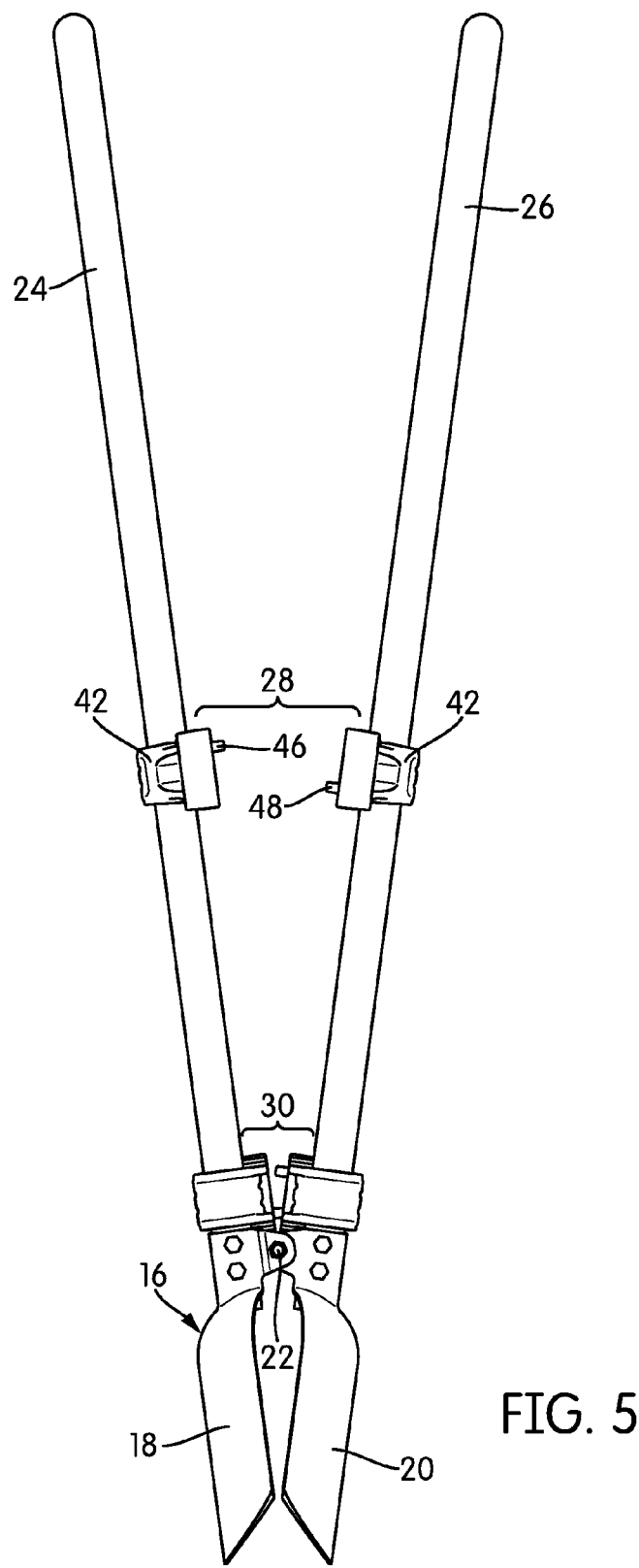
FIG. 5 is a side elevational view of the tool of FIG. 1 shown with handles apart.
Figure 6:
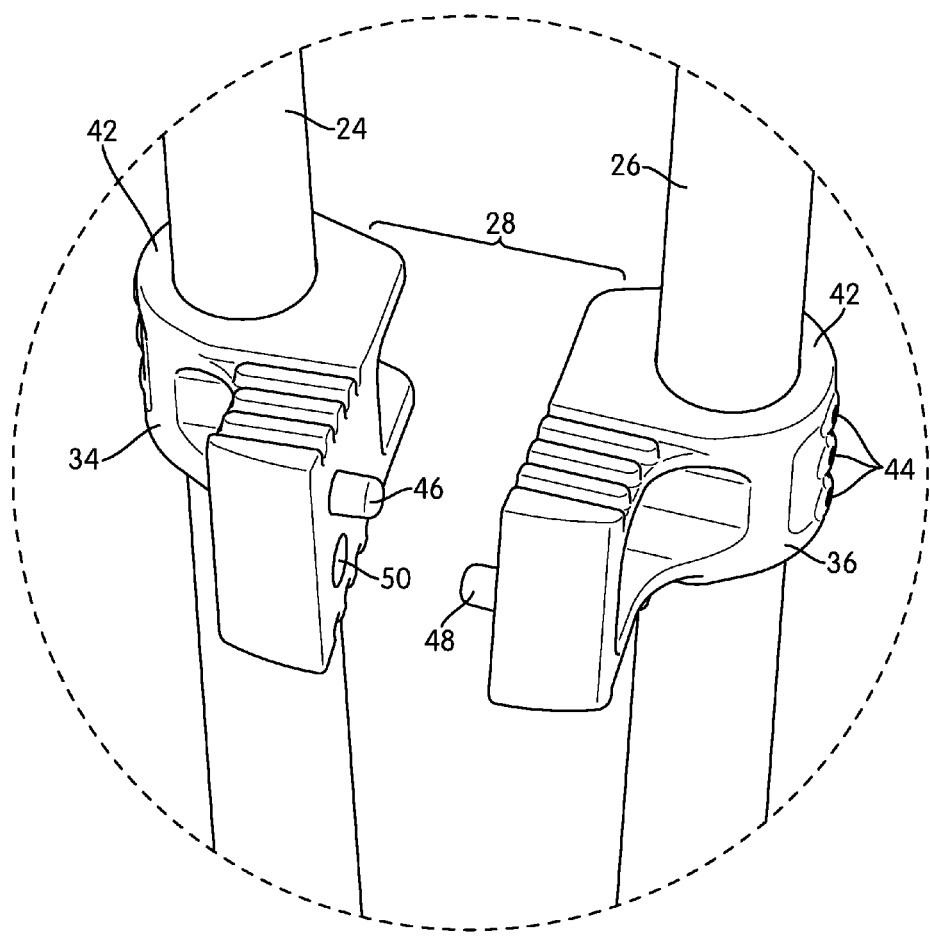
FIG. 6 is a detail perspective view of a portion of the handle of the tool of FIG. 1, illustrating the engagement of the foot rests.

As shown in FIG. 5 and the enlarged perspective view of FIG. 6, each of the portions 34, 36 has a collar 42 to secure it around one of the shafts 24, 26. The collar 42 may be secured either by set screws 44 that bear directly against the shaft 24, 26, or by a mechanism that tightens the collar 42 circumferentially to apply force. In some embodiments, the collars 42 may be permanently secured to the shafts 24, 26 by fasteners like screws, bolts, or dowel pins that actually embed in or transit through the shafts 24, 26, but it may be more advantageous in most embodiments if the collars 42 are adjustable in position. In addition to these means of fastening the foot rests 28, 30 to the shafts 24, 26, the foot rests 28, 30 may be overmolded onto the shafts 24, 26, welded onto the shafts 24, 26, or cast in place on the shafts 24, 26.

The two portions 34, 36, 38, 40 of each foot rest 28, 30 interlock and engage one another when the tool 10 is in the position shown in FIGS. 1, 2, and 4. As shown in FIG. 6, each portion 34, 36 has a peg 46, 48 that extends toward the other portion 34, 36. Each portion 34, 36 also has a complementary receiving opening 50 (only one of the openings is shown in the view of FIG. 6) positioned to accept the peg 46, 48 from the other portion 34, 36. As can be appreciated from FIG. 6, aside from the pegs 46, 48, the facing surfaces of the portions 34, 36 are essentially flat and are intended to be parallel to one another when the two shafts 24, 26 are parallel to one another.

The engagement of the portions 34, 36, 38, 40 rigidifies the foot rests 28, 30, making the result stronger and stiffer than two independent shafts 24, 26 would be. The engagement of the portions 34, 36, 38, 40 also maintains the alignment of the digging blades 18, 20 during digging, and may also be helpful when the user pushes or wiggles the shafts 24, 26 from side to side in the process of digging. As those of skill in the art will understand, driving force can be applied equally through both shafts 24, 26.

The manner of engagement of the portions 34, 36, 38, 40 may differ from embodiment to embodiment, and other embodiments may use other forms of connectors. One advantage of the pegs 46, 48 is that they do not require the user to manually disengage a latch before the shafts 24, 26 will part. However, in some embodiments, latches and other mechanisms that require the user to disengage them may be used. Additionally, because the pegs 46, 48 are permanently attached, they cannot be detached or lost.

The foot rests 28, 30 may be made of any number of materials. For example, they may be made of a cast metal, such as aluminum or steel. They may also be molded from any number of plastics. For example, the foot rests 28, 30 may be made of nylon, polycarbonate/ABS blends, polyethylene-polypropylene blends or copolymers, or polyphthalamide. The foot rests 28, 30 may also be made of composite materials, including glass-filled plastics. In some cases, a layer of rubber, or another high-friction surface, may be applied to or co-molded with the upper and lower surfaces of the foot rests 28, 30.

As was described briefly above, tools 10 according to embodiments of the invention may be produced and sold in the form illustrated in FIGS. 1-6, with foot rests 28, 30 already installed at appropriate locations. Alternatively, kits including a number of foot rests 28, 30 may be sold for later attachment to a standard post-hole digging tool. In addition, kits may be sold for attaching additional foot rests 28, 30 to a tool that already includes them.

While the invention has been described with respect to certain embodiments, the embodiments are intended to be exemplary, rather than limiting. Modifications and changes may be made within the scope of the invention, which is defined by the appended claims.

What is claimed is:

1. A foot rest for a post-hole digger of the type including a pair of opposed digging blades hingedly connected to one another and mounted on respective ends of first and second shafts, comprising:
   a first portion including
      a first attachment section adapted to attach the first portion to the first shaft of the post-hole digger,
      a first foot rest portion with a first, up-angled upper foot contact surface, and
      a first complementary set of engaging members; and
   a second portion including
      a second attachment section adapted to attach the second portion to the second shaft of the post-hole digger,
      a second foot rest portion with a second, up-angled upper foot contact surface, and
      a second complementary set of engaging members adapted to engage the first complementary set of engaging members to interlock the first and second portions such that the first and second upper foot contact surfaces are substantially contiguous with one another;
   wherein the first and second foot rest portions further comprise respective first and second lower foot contact surfaces opposite the respective first and second upper foot contact surfaces, such that the foot rest is symmetrical about a bisecting horizontal plane.

2. The foot rest of claim 1, wherein:
   the post-hole digger has a bore diameter defined by a combined diameter of the pair of opposed digging blades; and
   the foot rest is sized such that it does not extend beyond a bore diameter of the post-hole digger.

3. The foot rest of claim 1, wherein the first and second upper foot contact surfaces are angled so as to be higher toward an outer edge and lower toward the first and second shafts.

4. The foot rest of claim 1, wherein the first and second attachment sections comprise collars adapted to adjustably attach to the first and second shafts, respectively.

5. The foot rest of claim 1, wherein the first and second complementary sets of engaging members comprise a set of pegs and a complementary set of openings sized and positioned for the pegs.

6. The foot rest of claim 1, wherein the first and second foot contact surfaces have angles in the range of about 5° to 30°.

7. A post-hole digger, comprising:
   a pair of opposed digging blades connected to one another at a hinge for movement toward and away from each other, each of the pair of opposed digging blades being connected to a separate shaft;
   at least one foot rest connected to the shafts of the post-hole digger, the foot rest including
   a first portion including
      a first attachment section adapted to attach the first portion to one of the shafts of the post-hole digger,
      a first foot rest portion with a first upper foot contact surface, and
      a first complementary set of engaging members, and
   a second portion including
      a second attachment section adapted to attach the second portion to the other shaft of the post-hole digger,
      a second foot rest portion with a second upper foot contact surface, and
      a second complementary set of engaging members adapted to engage the first complementary set of engaging members to interlock the first and second portions when the shafts are at least substantially parallel to one another, such that the first and second upper foot contact surfaces are substantially contiguous with one another.

8. The post-hole digger of claim 7, wherein:
   the post-hole digger has a bore diameter defined by a combined diameter of the pair of opposed digging blades; and
   the foot rest is sized such that it does not extend beyond a bore diameter of the post-hole digger.

9. The post-hole digger of claim 8, wherein the foot rest extends outward in a direction or directions angularly offset from a major extent of the pair of opposed digging blades.

10. The post-hole digger of claim 8, further comprising at least two foot rests spaced from one another along the length of the shafts.

11. The post-hole digger of claim 10, wherein the at least two foot rests face different directions.

12. The post-hole digger of claim 8, wherein the first and second upper foot contact surfaces are angled so as to be higher toward an outer edge and lower toward the shafts.

13. The post-hole digger of claim 8, wherein the first and second attachment sections comprise collars adapted to adjustably attach to the first and second shafts, respectively.

14. The post-hole digger of claim 8, wherein the first and second foot rest portions further comprise respective first and second lower foot contact surfaces opposite the respective first and second upper foot contact surfaces.

15. The post-hole digger of claim 14, wherein the foot rest is symmetrical about a bisecting horizontal plane, such that the first and second lower foot contact surfaces are mirror images of the first and second upper foot contact surfaces.

16. A post-hole digger, comprising:
   a pair of opposed digging blades connected to one another at a hinge for movement toward and away from each other, each of the pair of opposed digging blades being connected to a separate shaft;
   at least two foot rests connected to the shafts of the post-hole digger and extending outwardly therefrom, the at least two foot rests being spaced from one another vertically along the lengths of the shafts, each of the at least two foot rests including
   a first portion including
      a first attachment section adapted to attach the first portion to one of the shafts of the post-hole digger,
      a first foot rest portion with an up-angled first upper foot contact surface, and
      a first complementary set of engaging members, and
   a second portion including
      a second attachment section adapted to attach the second portion to the other shaft of the post-hole digger,
      a second foot rest portion with an up-angled second upper foot contact surface, and
      a second complementary set of engaging members adapted to engage the first complementary set of engaging members to interlock the first and second portions when the shafts are at least substantially parallel to one another such that the first and second upper foot contact surfaces are substantially contiguous with one another;

wherein the at least two foot rests extend in different directions relative to one another.

17. The post-hole digger of claim 16, wherein:
the post-hole digger has a bore diameter defined by a combined diameter of the pair of opposed digging blades; and
the at least two foot rests are sized such that they do not extend beyond a bore diameter of the post-hole digger.

18. The post-hole digger of claim 16, wherein the at least two foot rests are oriented to extend outwardly in a different direction or directions than a major extent of the pair of opposed digging blades.

19. A foot rest for a post-hole digger of the type including a pair of opposed digging blades hingedly connected to one another and mounted on respective ends of first and second shafts, comprising:
a first portion including
a first attachment section adapted to attach the first portion to the first shaft of the post-hole digger,
a first foot rest portion with a first, up-angled upper foot contact surface, and
a first complementary set of engaging members; and
a second portion including
a second attachment section adapted to attach the second portion to ft the second shaft of the post-hole digger,
a second foot rest portion with a second, up-angled upper foot contact surface, and
a second complementary set of engaging members adapted to engage the first complementary set of engaging members to interlock the first and second portions such that the first and second upper foot contact surfaces are substantially contiguous with one another;
wherein the first and second complementary sets of engaging members comprise a set of pegs and a complementary set of openings sized and positioned for the pegs.

* * * * *